_(12)_ United States Patent
Rada et al.

(10) Patent No.: US 8,877,663 B2
(45) Date of Patent: Nov. 4, 2014

(54) CRYSTAL GLASS HAVING REFRACTIVE INDEX HIGHER THAN 1.53 WITHOUT A CONTENT OF COMPOUNDS OF LEAD, BARIUM AND ARSENIC

(75) Inventors: Miroslav Rada, Staňkov (CZ); Květa Sázavová, Jablonec nad Nisou (CZ); Jan Kořenský, Jablonec nad Nisou (CZ); Jiří Vavřena, Semily (CZ)

(73) Assignee: Preciosa A.S., Jablonec nad Nisou (CZ)

( * ) Notice: Subject to any disclaimer, the term of this patent is extended or adjusted under 35 U.S.C. 154(b) by 60 days.

(21) Appl. No.: 13/877,313

(22) PCT Filed: Sep. 1, 2011

(86) PCT No.: PCT/CZ2011/000085
§ 371 (c)(1),
(2), (4) Date: May 31, 2013

(87) PCT Pub. No.: WO2013/029573
PCT Pub. Date: Mar. 7, 2013

(65) Prior Publication Data
US 2013/0252797 A1    Sep. 26, 2013

(51) Int. Cl.
*C03C 3/093*  (2006.01)
*C03C 4/00*  (2006.01)
*C03C 3/097*  (2006.01)

(52) U.S. Cl.
CPC .............. *C03C 4/0028* (2013.01); *C03C 3/097* (2013.01)
USPC .......................................................... 501/67

(58) Field of Classification Search
CPC .............................. C03C 4/0028; C03C 3/097
USPC .......................................................... 501/67
See application file for complete search history.

(56) References Cited

U.S. PATENT DOCUMENTS 7,202,188 B2 * 4/2007 Sprachmann et al. .......... 501/67
2011/0052907 A1 * 3/2011 Shibata et al. ................ 428/332

FOREIGN PATENT DOCUMENTS

WO          9513993          5/1995

* cited by examiner

*Primary Examiner* — Karl Group
(74) *Attorney, Agent, or Firm* — Dykema Gossett PLLC

(57) ABSTRACT

This invention relates to a crystal glass having a refractive index higher than 1.53 and a high mechanical strength, free of any content of compounds of lead, barium and arsenic and guaranteeing maximum safety for health, which consists in that it comprises by weight: 55-70% $SiO_2$, 0.05-3.5% $Li_2O$, 2-15% $Na_2O$, more than 3% and less than 5% or more than 15% and less than 19% $K_2O$, 5 to 10% CaO, more than 1% and less than 4% or more than 7% and less than 8% ZnO, 0.1-3.5% $B_2O_3$, 0.1-3.5% $Al_2O_3$, 0.1-3.5% $TiO_2$, less than 3.5% $ZrO_2$, 0.05-1.5% $Gd_2O_3$, 0.05-1% $P_2O_5$, 0.1-1% $Sb_2O_3$.

8 Claims, No Drawings

CRYSTAL GLASS HAVING REFRACTIVE INDEX HIGHER THAN 1.53 WITHOUT A CONTENT OF COMPOUNDS OF LEAD, BARIUM AND ARSENIC

FIELD OF THE INVENTION

The invention relates to a crystal glass with a refractive index higher than 1.53 and high mechanical strength that does not contain any compounds of lead, barium and arsenic and intended for the production of artificial jewellery and chandelier semi-finished products and final products made from them. This glass is also intended for the manufacture of glass chandeliers and household items.

This glass is characterized by a very good workability in melting, shaping and polishing, its brightness reaches at least 93%, its density is at least 2.54 g/cm$^3$ and its Young's modulus of elasticity is above 90 GPa and it is characterized by increased chemical resistance, reduced solarization and reduced toxicity, ensuring maximum health safety in common use of the products from this glass.

BACKGROUND OF THE INVENTION

High-quality crystal glasses have to meet the conditions for their use in terms of optical parameters, mechanical parameters and other physicochemical properties, as well as in terms of health and safety criteria. Due to the significant change in the assessment of the crystal glass after 1991, particularly in terms of their safety for health, environmental impact on the environment and toxicity to consumers, manufacturers are trying to modify properties of modern consumer and decorative glass so as to meet the above specified requirements. This can be achieved by changing the composition of the base glass matrix.

Currently, according to Directive 69/493/ECC four grades of crystal glass are produced, which grades are the highly leaded crystal, the leaded crystal, the crystaline and the crystal glass. However, by definition, all the glasses mentioned contain either lead oxide and/or barium oxide. The EU legislation, which is now in force, controls the use of compounds of the heavy metals such as Cd, Pb, Hg and Cr.

An example of such regulation is EU Directive No. 2002/95/ECC (Restriction of the Use of Certain Hazardous Substances in Electrical and Electronic Equipment—RoHS), issued Jan. 27, 2003 and amended Aug. 18, 2005 (which entered into force on Jul. 1, 2006). which Directive restricts the use of toxic metals in electrical and electronic equipment. This Directive restricts the use of these metals in light bulbs, electric discharge lamps, glass solders, but also in glass lighting accessories and consumer electronic items. Also, the EU Directive No. 94/62/ECC requires manufacturers to limit the harmful effects of heavy metals in the production and use of glass packaging containers.

Another limitation for the use of toxic metals represents The Consumer Product Safety Improvement Act—CPSIA, issued in 2008, dealing with the limits established by the Consumer Product Safety Commission—CPSC, which limits the products that are coming into contact with children under the age of 12 have to comply with. In Section 101, this Act stipulates that after Feb. 10, 2009, products designed or intended for children under 12 years must not contain more than 600 ppm of lead (leady ions), from Aug. 14, 2009, must contain less than 300 ppm of lead and starting with Aug. 14, 2011 limit can be reduced to 100 ppm and below. Artificial jewellery and ornamental objects are designed both for adults and children and the manufacturer must ensure the health safety and toxicological "safety" to all users.

For the leaded crystals characteristic are particularly their high density ≥2.9 g/cm$^3$, high refractive index ≥1.545, and high optical dispersion. Technological properties are also favourable.

According to their density and refractive index, health safe glasses can be divided into two groups. The first group consists of glasses having density and refractive index that are comparable with those of the leaded crystal. These glasses are listed in Table 1 below. The other group consists of glasses having density, which is not according to the Directive 69/493/ECC and their refractive index is comparable with or lower than that of the leaded crystal. These glasses are listed in Table 2 and Table 3 below.

As it is shown in the tables, the following oxides: MgO, CaO, SrO, ZnO, La$_2$O$_3$, Bi$_2$O$_3$, TiO$_2$, ZrO$_2$, SnO$_2$, Nb$_2$O$_5$, Ta$_2$O$_5$, Y$_2$O$_3$, Yb$_2$O$_3$ and WO$_3$ were most commonly used in the glass skeleton as a substitute for PbO and BaO. All compounds used in the skeleton of the glass safe for health exhibit low toxicity or are non-toxic.

According to the patents granted on them, the compositions of the glasses listed in Table 1 contain neither the toxic PbO nor the BaO. The patent granted to the Baccarat company uses ZnO, SrO and CaO oxides as a replacement for PbO. The patent granted to the British Glass is based on the use of Bi$_2$O$_3$, TiO2 and SrO. The company Nachtmann stabilizes by a combination of TiO$_2$, ZnO and SrO. The Swarovski company makes use preferably of a combination of the ZnO and CaO oxides. All the glasses mentioned are approaching the leaded crystal glass both in their density and their refractive index.

TABLE 1

Composition of glasses having refractive index ≥1.54 and density>2.63 g/cm$^3$

| Oxide (wt. %) | Baccarat EP 0553586 A1 | British Glass GB 2280432 A | Nachtmann DE 10258923 A1 | Swarovski[b] EP 1725502 A1 |
|---|---|---|---|---|
| SiO$_2$ | 53-58 | 50-65 | 55-68 | 50-60 |
| Li$_2$O | 0-0.3 | Σ M$_2$O 12-23 | — | 0.5-3 |
| Na$_2$O | 4.5-7.5 | | 5-12 | 12-15 |
| K$_2$0 | 6-10 | | 9-15 | <3 |
| MgO | — | — | — | <2 |
| CaO | 0-9 | 0-15[a] | — | 4-11 |
| SrO | 0-12 | 1-20 | <5 | CaO replacement |
| BaO | — | — | — | — |
| ZnO | 16-21 | 0-15[a] | 3-10 | 8-16 |
| B$_2$0$_3$ | 0-1.2 | 0-15[a] | — | 0.6-4 |
| Al$_2$0$_3$ | 0-1.5 | 0-15[a] | — | 0.25-5 |
| La$_2$0$_3$ | 0-3 | 0-15[a] | — | <5 |
| Bi$_2$0$_3$ | — | 1-20 | — | <3 |
| TiO$_2$ | 0-2 | 1-15 | 8.5-14 | <5 |
| ZrO$_2$ | — | 0-15[a] | — | <3 |
| SnO$_2$ | 0-2.5 | — | — | yes |
| Nb$_2$0$_6$ | — | — | — | <1 |
| Ta$_2$O$_5$ | — | — | — | <1 |
| Y$_2$0$_3$ | — | — | — | <3 |

TABLE 1-continued

Composition of glasses having refractive index ≥1.54 and density>2.63 g/cm³

| | Patent Owner/Patent No. | | | |
|---|---|---|---|---|
| Oxide (wt. %) | Baccarat EP 0553586 A1 | British Glass GB 2280432 A | Nachtmann DE 10258923 A1 | Swarovski[b] EP 1725502 A1 |
| Yb₂O₃ | — | — | — | <1 |
| WO₃ | — | — | — | <3 |
| Clarifying agent | Sb, As, Ce | Sb, As, Ce | Sb, As | Sb |
| | Guaranteed values of variables | | | |
| ρ[g/cm³] | ≥2.9 | ≥2.7 | >2.63 | ≥2.7 |
| $n_D$ | ≥1.545 | ≥1.55 | ≥1.54 | ≥1.55 |

[a]Further, the glass contains by weight one oxide or more oxides from the group of the mentioned oxides at total level 15%,
[b]By weight, total amount of the Pb, Ba, As oxides is below 0.1%, total content of Ti and La oxides is below 5% and total content of Nb, Ta, Yb, Y, W, Bi, Zr oxides is below 5%, wherein it contains not more than 1% of each of the Nb, Ta, Yb oxides, and not more than 3% of each of the Y, W, Bi, Zr oxides. The total content by weight of ZnO and CaO is higher than 15%, CaO is partly replaced by SrO. The glass also contains 0.5-3% Li₂O. Total content by weight of Na₂O and Li₂O is less than 17%. Total content by weight of other components, regardless of Sb₂O₃, Nd₂O₅ and Er₂O₃ is less than 2%.

According to the granted patents and the utility model, the glass compositions of the glass group, listed in Tables 2 and 3, also do not contain any toxic PbO or BaO.

TABLE 2

Composition of glasses having refractive index ≥1.52 and density ≥2.43 g/cm³

| | Patent Owner/Patent No. | | | |
|---|---|---|---|---|
| Oxide (wt. %) | Inn Crystal Glass EP 0547263 A1 | Moser CZ 294797 B6 | Moravské sklárny Květná CZ 19984 U1 | Nachtmann DE 19936699 A1 |
| SiO₂ | 65-70 | 71.5-76.5 | 65.5-75.5 | 59-71 |
| Li₂O | — | — | — | 0.01-2 |
| Na₂O | 4-12 | 5-9 | 6-10 | 3-15 |
| K₂O | 4-12 | 8-12 | 8-12 | 0.08-11 |
| MgO | — | — | <2 | 0.5-8 |
| CaO | 6-9 | 5-9 | 5-9 | 2-10 |
| SrO | — | — | 1-5 | 0.001-0.1 |
| BaO | — | — | — | — |
| ZnO | 4-7 | 0.5-3.5 | <4 | 0.01-11 |
| B₂O₃ | 0.5-5 | 0.5-3.5 | <2 | 0.01-3 |
| Al₂O₃ | 1-5 | 0.1-2.1 | <2 | 0.01-4 |
| La₂O₃ | — | — | 0.5-5.5 | 0.001-4 |
| Bi₂O₃ | — | — | — | — |
| TiO₂ | 1-6 | — | — | 0.01-8 |
| ZrO₂ | 1-6 | — | — | — |
| SnO₂ | — | — | — | 0.001-3 |
| Nb₂O₅ | A | — | — | — |
| Ta₂O₅ | — | — | — | — |
| Y₂O₃ | — | — | — | — |
| Yb₂O₃ | — | — | — | — |
| WO₃ | — | — | — | — |
| Clarifying agent | Sb | Sb | Sb | Sb, As, SO₄²⁻, F |
| | Guaranteed values of variables | | | |
| ρ[g/cm³] | >2.45 | >2.43 | >2.52 | >2.45 |
| $n_D$ | ≥1.52 | >1.52 | >1.52 | >1.52 |

The company Inn Crystal Glass discloses a glass based on CaO, ZnO, ZrO₂ and/or TiO₂ modifiers. The company Moser discloses glass based on the CaO and ZnO oxides. The utility model of the Moravské sklárny. Květná, discloses glass based on a combination of CaO, MgO, SrO, ZnO and La₂O₃ oxides.

Patent of the company Nachtmann discloses presence of CaO, MgO, ZnO, TiO₂, La₂O₃ and SnO₂ oxides and of a certain water content.

TABLE 3

Composition of glasses having refractive index ≥1.52 and density ≥2.45 g/cm³

| | Patent owner/Patent No. | | | |
|---|---|---|---|---|
| Oxide (wt. %) | Rona SK 285523 B6 | Schott[a] EP 0564802 A1 | Toyo-sasaki Glass EP 2022767 A1 | Favrot, G. A., Truyol, A. EP 0701976 A1 |
| SiO₂ | 65.1-71.9 | 50-75 | 62-65 | 65-73 |
| Li₂O | — | 0-5 | — | 1.5-2.5 |
| Na₂O | 8-14 | 2-15 | 10-12 | 4-8 |
| K₂O | 6.5-9.9 | 5-15 | 8-10 | 0.2-0.7 |
| MgO | <0.6 | 0-5 | — | 2-5 |
| CaO | 8.6-13 | 3-12 | 3-4.2 | 5-8 |
| SrO | — | 0-7 | 2-3.2 | — |
| BaO | — | — | — | — |
| ZnO | 0.5-3.6 | 0-7 | 6-7.2 | 1.2-3 |
| B₂O₃ | — | 0-10 | — | 5-8 |
| Al₂O₃ | 0.01-3 | 0-5 | 2-3.2 | 2.5-4 |
| La₂O₃ | — | — | 0-1.2 | — |
| Bi₂O₃ | — | — | — | — |
| TiO₂ | — | 0-8 | 2.2-3 | 0.3-0.8 |
| ZrO₂ | 0.01-2.1 | 0-5 | 0-1.2 | 1.1-2.5 |
| SnO₂ | — | — | 0-1.2 | — |
| Nb₂O₅ | — | 0.1-5 | — | — |
| Ta₂O₅ | — | 0-5 | — | — |
| Y₂O₃ | — | — | 0-1.2 | — |
| Yb₂O₃ | — | — | — | — |
| WO₃ | — | — | — | — |
| Clarifying agent | Sb | Sb, F | Sb | Ce, SO₄²⁻ |
| | Guaranteed values or variables | | | |
| ρ[g/cm³] | ≥2.45 | ≥2.45 | ≥2.6 | unspecified |
| $n_D$ | ≥1.52 | >1.52 | ≥1.53 | unspecified |

[a]Total content by weight of TiO₂ + ZrO₂ + Nb₂O₅ + Ta₂U₃ oxides is in the range 0.3-12%

The Slovak manufacturer of crystal glass, Rona, protects glass based on a high CaO content and the presence of ZnO, ZrO₂, and MgO. The company Schott Glaswerke starts from an alkali-calcium skeleton, which is modified by a combination of the MgO, ZnO, TiO₂, ZrO₂, Nb₂O₅ and Ta₂O₅ oxides.

The company Toyo-Sasaki Glass provides glass with presence of the ZnO, CaO, SrO, TiO₂, La₂O₃, SnO₂ and Y₂O₃ oxides. And finally, inventors G. A. Favrot and A. Truyol disclose glass with the CaO, MgO, ZnO, ZrO₂ and TiO₂ oxides. This group of glass shows a lower value of glass density than what is that of the leaded crystal glass, and the refractive index also varies from lower values to the values comparable with those of the leaded crystal glasses.

Although the above mentioned lead-free glasses exhibit largely satisfactory properties, they still have these shortcomings. Some of them contain toxic As₂O₃ as clarifying agent, other ones use expensive and questionable components SrO, La₂O₃, Bi₂O₃, SnO₂, Nb₂O₅, Ta₂O₅, Y₂O₃, Yb₂O₃, WO₃, etc.

Another disadvantages of some of the solutions disclosed in the above-mentioned patent documents are high melting temperatures, relatively high content of the TiO₂, ZrO₂, B₂O₃ oxides, causing a yellowish hue of the resulting glass, respectively problems associated with volume and/or surface crystallization of glass. A high content of ZnO is often the cause of the increased corrosion of refractory materials used to build melting furnaces.

The objective of the invention is to eliminate these shortcomings.

SUMMARY OF THE INVENTION

Subject of the invention is a crystal glass having a refractive index higher than 1.53 and a high mechanical strength, free of any content of compounds of lead, barium and arsenic, what guarantees maximum safety for health, which crystal glass comprises by weight:

| | |
|---|---|
| 55-70% | $SiO_2$, |
| 0.05-3.5% | $Li_2O$, |
| 2-15% | $Na_2O$, |
| more than 3% and less than 5% or more than 15% and less than 19% | $K_2O$, |
| 5 to 10% | CaO, |
| more than 1% and less than 4% or more than 7% and less than 8% | ZnO, |
| 0.1-3.5% | $B_2O_3$, |
| 0.1-3.5% | $Al_2O_3$, |
| 0.1-3.5% | $TiO_2$, |
| less than 3.5% | $ZrO_2$, |
| 0.05-1.5% | $Gd_2O_3$, |
| 0.05-1% | $P_2O_5$, |
| 0.1-1% | $Sb_2O_3$. | whereas, for a glass of lower refractive index the lower range of ZnO content is preferable, when the $K_2O$ content range is both in the lower and the higher ranges, whereas for a glass of higher refractive index the higher range of ZnO content is rather preferable when the $K_2O$ content range is in the lower range, so as it corresponds and is expressed in the following examples of the invention embodiments.

Therefore the subject of the invention is the composition of a crystal glass with high refractive index, high mechanical strength and satisfactory crystallization characteristics.

Parameters of the crystal glass according to the invention are shown in Table 4.

TABLE 4

Parameters of the crystal glass according to this invention

| Parameter | Unit | Value |
|---|---|---|
| Refractive index | $\rho_D$ | ≥1.53 |
| Brightness | [%] | ≥93 |
| Density | [g/cm³] | ≥2.5 |
| Young's modulus of elasticity | [GPa] | ≥90 |
| Melting temperature/log η = 2/ | [° C.] | ≤1380 |
| Working temperature/log η = 4/ | [° C.] | ≤1010 |
| Softening temperature/log η = 7.65/ | [° C.] | ≤740 |
| Liquidus temperature | [° C.] | ≤1000 |
| The temperature of maximum crystallization rate | [° C.] | ≤940 |
| The maximum crystallization speed | [μm/min] | ≤1.5 |
| Hydrolytic resistance | [ml HCl [C = 0.01 mol/l] | ≤0.80 |

The basic skeleton of this crystal glass consists of alkali-calcium glass, which is toxically harmless. No harmful components of lead, barium and/or arsenic are added deliberately in this glass batch. However, they may appear in the final composition of the glass in amounts of hundredths of a percentage as impurities from the raw materials used, which impurities may be particularly the ZnO and $Sb_2O_3$ oxides. The basic skeleton of glass composition is modified by ZnO, $TiO_2$, respectively. $ZrO_2$ oxides, which oxides together with CaO $Li_2O$ significantly increase refractive index. Oxides $Al_2O_3$ and $B_2O_3$ improve hydrolytic resistance, and together with the $Li_2O$, $ZrO_2$, $TiO_2$ and CaO oxides they also improve mechanical strength. The higher the CaO and ZnO oxides content in the glass is, the higher is the refractive index, but also the liquidus temperature is and the value of crystallization rate also increases, wherein the influence of both oxides on the crystallization parameters is roughly comparable. However, during melting in electric melting tanks, the zinc oxide reduces specific electrical resistivity at the same temperature in comparison to calcium oxide, what causes greater corrosion of electrodes and refractory material, and has higher purchasing costs. It is responsible for refractory material corrosion also in the case of gas engines. But on the other hand, it has a favourable influence on the hydrolytic resistance. Therefore, from the economic point of view it is always better to keep the content of CaO and the maximum possible level and the amount of ZnO as low as possible, and simultaneously also replace the highest possible proportion of the more expensive potash and soda with cheaper lime. However, this replacement is limited by the increasing crystallization characteristics.

This has been surprisingly and unexpectedly solved by using a combination of $Gd_2O_3$ and $P_2O_5$ as follows:

Preferably the crystal glass of the present invention contains 0.05 to 0.8 wt % $Gd_2O_3$ and 0.05 to 0.8% $P_2O_5$ and the $Gd_2O_3/P_2O_5$ ratio is at least equal to 1:1;

Preferably the crystal glass of the present invention contains 0.05 to 0.15 wt % $Gd_2O_3$ and 0.1 to 0.8% $P_2O_5$ and the $Gd_2O_3/P_2O_5$ ratio is at least equal to 1:2;

Preferably the crystal glass of the present invention contains 0.1 wt % $Gd_2O_3$ and 0.2 to 0.8% $P_2O_5$ and the $Gd_2O_3/P_2O_5$ ratio is at least equal to 1:2.

In case of the so selected ratios there was a significant decrease both in the liquidus temperature and the temperature of maximum crystallization rate, and in particular, in the maximum crystallization rate. The improved hydrolytic resistance and abrasion was also surprising. Unexpected was also an improvement in the clarifying of the glass melt and formability of products.

The described combination of $Gd_2O_3$ and $P_2O_5$ can be used with similar results for all grades of the industrially produced glass.

This glass, with a combination of the $P_2O_5$ and $Gd_2O_3$ oxides, in addition to the fact that it does not contain harmful oxides of Pb, Ba and As, what is also met by some of the glasses according to the above-mentioned patent documents, also allows to reach high refractive index and high mechanical strength at relatively low content of ZnO, what limits corrosion of refractory materials used in melting furnaces, which corrosion is caused mainly by ZnO and $K_2O$. A particular advantage of the invention is that to achieve a high refractive index, it is not necessary to use expensive and controversial components, such as SrO, $La_2O_3$, $Bi_2O_3$, $SnO_2$, $Nb_2O_5$, $Ta_2O_5$, $Y_2O_3$, $Yb_2O_3$, $WO_3$, etc., as it is the case particularly for glasses according to the above cited patent documents, utility model, and other existing patents relating to the problems of the lead-free glasses.

The crystal glass according to the invention is clarified using a conventional clarifying $Sb_2O_3$ mixture and/or various grades of antimonate (V) together with sodium or potassium nitrates. However, common amounts of $CeO_2$ together with a nitrate or common quantities of sulphates, fluorides, as well as all sorts of commonly known combinations of the above components in the above-mentioned concentrations may also be uses.

The crystal glass according to the invention is discoloured by commonly known components in their usual possible and known combinations and in usual concentrations. Components or their combinations from the group of components $CeO_2$, $Er_2O_3$, $Nd_2O_3$, NiO, CoO, Mn and Se compounds and selenium compounds can be used.

Preferably, the crystal glass according to the invention is clarified and discoloured by usual clarifying and discolouring components and/or mixtures thereof in the usual concentrations.

The crystal glass according to the invention contains the usual amount of $Fe_2O_3$, which amount corresponds to its usual content in the crystal glass, and in accordance with the invention, it is brought into the glass by impurities from the raw materials used and by the content of $Fe_2O_3$ in shards.

The crystal glass according to the invention contains a minimum content of MgO, introduced into the glass as an impurity from the limestone and sand used.

EXAMPLES OF EMBODIMENTS OF INVENTION

Examples of embodiments of crystal glass according to the invention together with the identified parameters of this crystal glass are given in Table 5. The crystal glass in Example 1 does not meet the requirement of the directive 69/493/ECC that the overall mass content of oxides PbO, BaO, ZnO and $K_2O$ must be at least equal to 10%, but it meets the required values of the monitored parameters as well as the crystal glass according to examples of embodiments 2 and 3, which glasses meet the specified requirement. The composition in embodiment according to Example 2 defines a glass which will be easy to clarify, process and discolour because of the higher content of $K_2O$. The glass in the embodiment according to Example 3 is a low-melting glass with high refractive index corresponding to the leaded crystal glasses of the highest quality.

INDUSTRIAL USE

Crystal glass according to the invention is intended for the manufacture of artificial jewellery and chandelier semi-finished products and also products made from them, the production of glass chandeliers and household items.

But of course, it can be used anywhere else, where it will be appropriate due to its properties.

The invention claimed is:

1. Crystal glass having a refractive index higher than 1.53 free of any content of compounds of lead, barium and arsenic, comprising by weight:

| | |
|---|---|
| 55-70% | $SiO_2$, |
| 0.05-3.5% | $Li_2O$, |
| 2-15% | $Na_2O$, |
| more than 3% and less than 5% or more than 15% and less than 19% | $K_2O$, |
| 5 to 10% | CaO, |
| more than 1% and less than 4% or more than 7% and less than 8% | ZnO, |
| 0.1-3.5% | $B_2O_3$, |
| 0.1-3.5% | $Al_2O_3$, |
| 0.1-3.5% | $TiO_2$, |
| less than 3.5% | $ZrO_2$, |
| 0.05-1.5% | $Gd_2O_3$, |
| 0.05-1% | $P_2O_5$ |
| 0.1-1% | $Sb_2O_3$. |

2. The crystal glass according to claim 1, comprising by weight 0.05 to 0.8 wt % $Gd_2O_3$ and 0.05 to 0.8% $P_2O_5$ and the $Gd_2O_3/P_2O_5$ ratio is at least equal to 1:1.

3. The crystal glass according to claim 1, comprising by weight 0.05 to 0.15 wt % $Gd_2O_3$ and 0.1 to 0.8% $P_2O_5$ and the $Gd_2O_3/P_2O_5$ ratio is at least equal to 1:2.

TABLE 5

Composition of exemplary embodiments of the glass according to the invention in wt. % and their measured parameters

| | | Example | | |
|---|---|---|---|---|
| Oxide | | 1 | 2 | 3 |
| $SiO_2$ | | 67.066 | 63.173 | 59.125 |
| $Li_2O$ | | 0.850 | 0.541 | 2.149 |
| $Na_2O$ | | 8.199 | 2.797 | 11.397 |
| $K_2O$ | | 4.802 | 15.406 | 3.490 |
| CaO | | 8.202 | 8.503 | 7.188 |
| ZnO | | 2.401 | 2.005 | 7.711 |
| $B_2O_3$ | | 2.900 | 2.008 | 3.071 |
| $Al_2O_3$ | | 2.499 | 2.481 | 0.430 |
| $TiO_2$ | | 2.040 | 1.941 | 2.082 |
| $ZrO_2$ | | — | — | 2.082 |
| $Gd_2O_3$ | | 0.100 | 0.102 | 0.103 |
| P2O5 | | 0.401 | 0.503 | 0.701 |
| $Sb_2O_3$ | | 0.540 | 0.540 | 0.471 |

| Parameters measured | | | | |
|---|---|---|---|---|
| Refractive index $n_D$ | | 1.5302 | 1.5319 | 1.5624 |
| Density | [g/cm³] | 2.5434 | 2.5516 | 2.7058 |
| Young's modulus of elasticity E | [GPa] | 113.333 | 99.190 | 116.339 |
| Melting temperature/log η = 2/ | [° C.] | 1374 | 1376 | 1147 |
| Processing temperature/log η = 4/ | [° C.] | 986 | 1005 | 855 |
| Softening temperature/log η 7.65/ | [° C.] | 706 | 733 | 637 |
| Liquidus temperature | [° C.] | 959 | 956 | 850 |
| Temperature of the max, crystallization rate | [° C.] | 859 | 886 | 791 |
| Max. crystallization rate | [µm/min] | 1.235 | 0.633 | 0.122 |
| Hydrolytic resistance | [ml HCl [C = 0.01 mol/l]] | 0.26 | 0.61 | 0.36 |

4. The crystal glass according to claim 1, comprising by weight 0.1 wt % $Gd_2O_3$ and 0.2 to 0.8% $P_2O_5$ and the $Gd_2O_3/P_2O_5$ ratio is at least equal to 1:2.

5. The crystal glass according to claim 1, wherein it is clarified and discoloured by usual clarifying and discolouring components and/or mixtures thereof in the usual concentrations.

6. The crystal glass according to claim 1, comprising by weight:

| | |
|---|---|
| 67.066 | $SiO_2$ |
| 0.850 | $Li_2O$ |
| 8.199 | $Na_2O$ |
| 4.802 | $K_2O$ |
| 8.202 | CaO |
| 2.401 | ZnO |
| 2.900 | $B_2O_3$ |
| 2.499 | $Al_2O_3$ |
| 2.040 | $TiO_2$ |
| 0.100 | $Gd_2O_3$ |
| 0.401 | $P_2O_5$ |
| 0.540 | $Sb_2O_3$. |

7. The crystal glass according to claim 1, comprising by weight:

| | |
|---|---|
| 63.173 | $SiO_2$ |
| 0.541 | $Li_2O$ |
| 2.797 | $Na_2O$ |
| 15.406 | $K_2O$ |
| 8.503 | CaO |
| 2.005 | ZnO |
| 2.008 | $B_2O_3$ |
| 2.481 | $Al_2O_3$ |
| 1.941 | $TiO_2$ |
| 0.102 | $Gd_2O_3$ |
| 0.503 | $P_2O_5$ |
| 0.540 | $Sb_2O_3$. |

8. The crystal glass according to claim 1, comprising by weight:

| | |
|---|---|
| 59.125 | $SiO_2$ |
| 2.149 | $Li_2O$ |
| 11.397 | $Na_2O$ |
| 3.490 | $K_2O$ |
| 7.188 | CaO |
| 7.711 | ZnO |
| 3.071 | $B_2O_3$ |
| 0.430 | $Al_2O_3$ |
| 2.082 | $TiOO_2$ |
| 2.082 | $ZrOO_2$ |
| 0.103 | $Gd_2O_3$ |
| 0.701 | $P_2O_5$ |
| 0.471 | $Sb_2O_3$. |

* * * * *